UNITED STATES PATENT OFFICE.

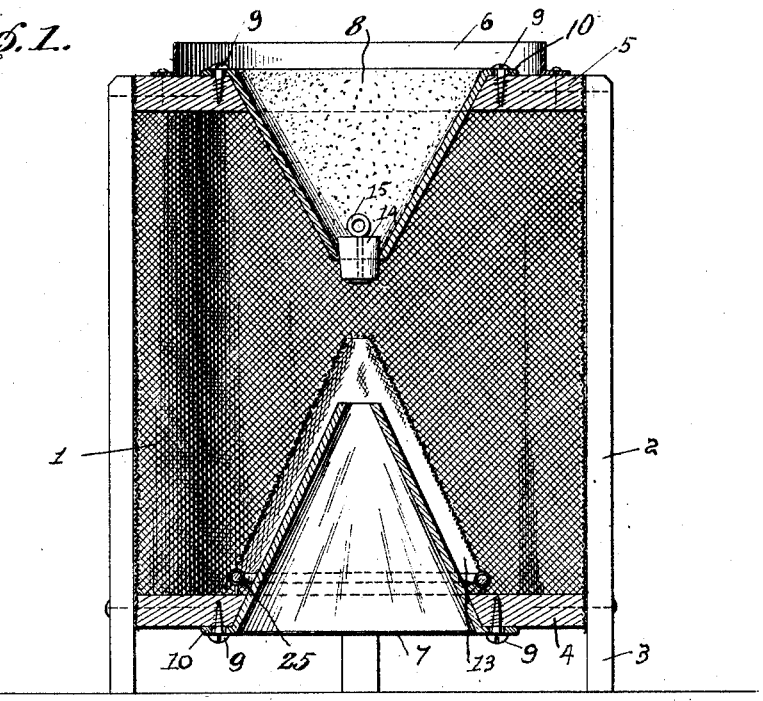
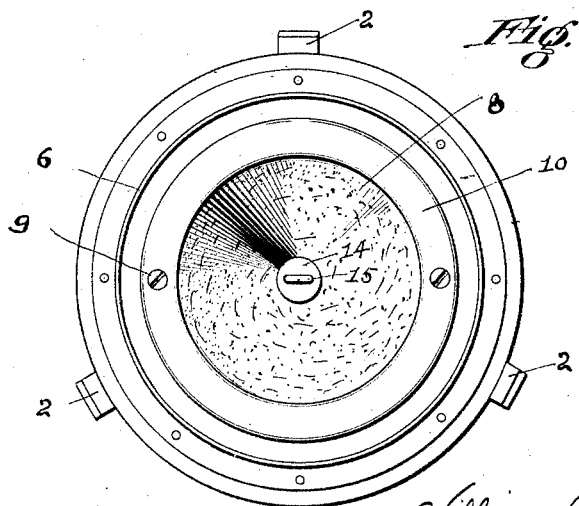

WILLIAM B. MILLER, OF SCHULENBURG, TEXAS.

TRAP.

1,366,059.     Specification of Letters Patent.     Patented Jan. 18, 1921.

Application filed October 17, 1919. Serial No. 331,388.

*To all whom it may concern:*

Be it known that I, WILLIAM B. MILLER, a citizen of the United States, residing at Schulenburg, in the county of Fayette and State of Texas, have invented new and useful Improvements in Traps, of which the following is a specification.

My present invention pertain to insect traps, and it contemplates the provision of a trap that may be used with equal facility as a fly trap and an ant trap, and this with but a small amount of effort on the part of those practising my invention.

The invention in all of its details will be fully understood from the following description and claim when the same are read in connection with the drawings, accompanying and forming part of this specification, in which:

Figure 1 is a longitudinal sectional view illustrating my invention as the same appears when ready for storage or packed ready for shipment.

Fig. 2 is an end elevation of the ant receiving portion of the device and its relation to the frame of the trap.

Similar numerals of reference designate corresponding parts in both views of the drawings.

My novel invention comprises the frame members 2, and secured to said members 2 is a cylindrical reticulated portion 1 that is open at its upper and lower ends. These ends are tacked or otherwise secured to members 4 and 5 and the said members are provided with an opening in their centers as illustrated.

Arranged on or otherwise secured to one of the portions 4 and 5, and preferably the portion 5, is a band 6, that extends outwardly from the trap and is provided so as to produce a member upon which the trap rests and is held a slight distance from the ground.

Secured in the member 5, and by means of screws 9 is a cone shaped portion 8 that by preference is roughened as illustrated, and this cone shaped portion may be permanently arranged in the portion 5. The said cone shaped portion 8 extends inwardly into the trap and is provided with a removable cork or other closure member 14 to which I secure a handle portion 15 by means of which the cork 14 may be removed from the opening at the inner end of the cone shaped member 8, when occasion demands. As illustrated by Fig. 2, the cone shaped member 8 is provided with a flange 10 through which the screws 9 or other fastening means pass, so as to secure the cone to the member 5.

As clearly shown in Fig. 1, I provide a cone shaped portion 7, that is also provided with a flange 10 through which pass screws or other securing means 9 by which the said cone member 7 is secured to the portion 4 of the trap. The said portion 7 is similar to portion 8 with the exception that it is highly polished on both its inner and outer surfaces.

As shown in Fig. 1, when the device is to be used as an ant trap or for the purpose of storage, I leave the reticulated cone shaped portion 13 inside of the trap and surrounding the cone 7. This cone 13 is provided with a band 25 for an important purpose hereinafter set forth.

At its lower ends the frame 2 is provided with legs 3 upon which it rests when the device is used as a fly trap.

When it is desired to use the invention as an ant trap, the trap is placed on the ground with the rim 6 resting upon the ground. The cork or plug 14 is then removed from the cone 8, and hence ants will crawl up said cone and thence into the trap where they will be prevented from leaving because of the cone 13 and cone 7. Should the ants for any reason be able to pass through the opening at the top of the cone 13 and thus gain access to the space between the cones 13 and 7, they will because of the highly polished character of the cone 7 be prevented from gaining a foot-hold on said cone in attempting to crawl to the opening in this cone 7.

When it is desired to employ the invention as a fly trap, the screws 9 are removed from the rim 10 of the cone 7, and the cone 7 may then be readily removed from the trap. Then by slightly contracting the band or rim 25 of the cone 13, this cone may be readily pulled through the opening in the member 4. The user of my invention may then readily place the cone of reticulated material in the opening of the portion 4 and because of the band 25, the said reticulated cone will fit snugly about the opening in the member 4. Of course the plug 14 must be replaced in the opening of the cone 8 and the trap as a whole placed on the legs 3.

It will be apparent that the cone 7 is only employed in the device when the same is used for catching ants or similar insects.

The cone 13 is provided at its lower end with a stiffening wire as illustrated, but this wire is of such a material that it may easily be contracted or folded over in order that cone 13 may be pulled out of the trap.

The said stiffening wire of the cone enables the lower end of said cone to be securely placed in the trap and prevents flies from crawling between the space of the lower opening and the cone.

The rim 25 is simply for the purpose of reinforcing the opening of the trap and will assure a snug fit of the rim and cone when properly positioned in the trap.

Having described my invention, what I claim and desire to secure by Letters-Patent, is:

In a trap for the purpose set forth, the combination of a frame portion, a reticulated cylindrical portion open at its ends secured on the frame portion, members having openings in their centers and being provided to close the openings of the reticulated cylindrical portion, a cone shaped portion open at its inner end secured in the opening of one of said members, a closure for the opening of the cone shaped member; said cone shaped member being roughened on one of its surfaces, and a removable cone shaped member secured in the opening of the other member, and a reticulated cone shaped member, adapted to be used in conjunction with the last-named cone shaped member and also adapted to be used interchangeably with said cone shaped member to close the passage to the opening of the last-named member.

In testimony whereof I have hereunto set my hand in presence of two subscribing witnesses.

WILLIAM B. MILLER.

Witnesses:
 EDGAR J. BELL,
 ALFRED SCHLAFTI.